United States Patent [19]

Knowles

[11] Patent Number: 4,752,431
[45] Date of Patent: Jun. 21, 1988

[54] PERMANENT CONFORMING PIPE FOR CONDUCTING FLUIDS AND THE LIKE AND METHOD FOR PRODUCING THE SAME

[76] Inventor: Albert H. Knowles, Moniack Bridge, Kirkhill, Inverness, Scotland, IV5 7PQ

[21] Appl. No.: 734,349

[22] Filed: May 14, 1985

[51] Int. Cl.⁴ .................... B32B 31/06; B32B 35/00
[52] U.S. Cl. .................................. 264/512; 156/71; 156/294; 264/35; 264/36; 264/82; 264/261; 264/262; 405/156
[58] Field of Search ............... 264/82, 36, 35, 510, 264/512, 516, 240, 257, 259, 261, 262, 266; 156/71, 294, 325; 405/155, 68, 156

[56] References Cited

U.S. PATENT DOCUMENTS

| | | | |
|---|---|---|---|
| 3,399,094 | 8/1968 | Skoggard et al. | 156/79 |
| 3,823,565 | 7/1974 | Takada | 405/156 |
| 4,009,063 | 2/1977 | Wood | 156/71 |
| 4,110,991 | 9/1978 | Torkuhl | 405/157 |
| 4,350,548 | 9/1982 | Zenbayaski et al. | 156/156 |
| 4,427,480 | 1/1984 | Kamuro et al. | 156/287 |
| 4,496,499 | 1/1985 | Brittain et al. | 264/36 |

*Primary Examiner*—Jan H. Silbaugh
*Assistant Examiner*—Karen D. Kutach
*Attorney, Agent, or Firm*—Rines and Rines, Shapiro and Shapiro

[57] ABSTRACT

A process for making a rigid pipe with the aid of flexible parallel coextensive skins interiorly filled with a catalyst-curable flexible filler, where the flexible skins and filler are laid along any desired surface contour and then the interior space within the inner skin is expanded to form the pipe and catalyst is introduced through one or both of the skins which is catalyst-permeable, to produce a rigidized pipe.

2 Claims, 2 Drawing Sheets

PERMANENT CONFORMING PIPE FOR CONDUCTING FLUIDS AND THE LIKE AND METHOD FOR PRODUCING THE SAME

The present invention relates to permanent surface-conforming structures including pipes for conducting fluids or for surrounding objects, such as cables, or for use as a lining for existing surfaces including pipelines; and to a method for producing the same. The present invention is more particularly concerned with a pipe that can be easily stored in a non-rigid form, layed out or installed on a surface such that the pipe or panel conforms to topographical convolutions on the surface, and made rigid in situ such that the pipe forms a permanent structure of preselected dimensions.

Turning first, to the important pipe or conduit application of the invention, pipeline structures for conducting water, gas, oil and other fluids, especially structures of a diameter over six inches, are generally made of rigid sections, having lengths that are convenient for handling and which are connected to form a single long pipe. Pipes of this type, often made of metal, clay or concrete, are placed on the ground or other surface and retain the same generally cylindrical structure even under pressure from internally conducted fluids or outside pressure. Such pipes are generally of a uniform cylindrical shape requiring substantial ground contouring prior to the laying of the pipe to ensure even support along its length. Additionally, since the pipeline is made of short sections of linear pipe, a large number of fitting or joining members must be used both to extend the pipeline over the desired length and to provide for a non-linear pipeline that can avoid obstacles or contours with irregular supporting surfaces. Such joints or fittings cause additional expense and weakness of the pipeline at the joints, as well as providing only for a limited discrete non-linearity of the pipeline.

In addition, large diameter rigid pipes are bulky and expensive to transport. Since they are generally made individually by molds or castings and must be of a thickness and strength sufficient to support their own weight and allow both handling and installation without damage, they are also costly to produce.

Smaller bore pipes, such as those used for fire fighting equipment, and the like, are generally made of a flexible material, such as canvas or plastic materials, which can be folded and stored on a roll. In use, the flexible pipe is forced open to conform to a generally cylindrical shape by the pressure of the fluid being conducted. Since the pipe retains its flexible form during fluid conducting use, folding, squashing or kinking of the pipe with its attendant disruption of smooth fluid flow may result from a mutiplicity of environmental or use circumstances.

The present invention in its application to pipe or conduit formation and useage, provides for a permanent surface-conforming pipe that may be used to conduct fluids, (such as water, gas, stream, oil, etc.) or to serve as a conduit as for wires or cables, or to re-line the interior of a previously installed pipe used for like or related purposes. The instant pipe is constructed from an inner and an outer layer of flexible material surrounding a flexible reinforcing layer that is curable to create a rigid structurally supporting form for the pipe. The pipe, in its flexible form may be readily stored, as on a roll, and may be installed by laying over a supporting surface. The flexibility of the pipe provides for self-adjustment of level and shape to allow the pipe to conform to surface contours, indulations or other irregularities. Once the pipe is layed in the desired pattern, it is forced open to conform to a generally cylindrical shape by the introduction of a pressurized fluid into the pipe, and the inner reinforcing layer is cured to rigidity, thus providing a permanent pipe for conducting fluids and the like that conforms to the desired pattern of the installation. Such a system is also useful to re-line existing pipes by drawing the flexible pipe through one or more installed rigid pipes, expanding the pipe to conform to the interior shape of the existing pipeline and curing the reinforcing layer to provide a new pipeline secured within the old pipeline without the expense and delay of removing the old pipeline system.

It is accordingly an object of the present invention to provide a novel method of and apparatus for providing a permanent conforming pipe or conduit structure for conducting fluids and the like that is not subject to the aforementioned limitations, but instead is capable of being easily stored and installed in long, non-rigid lengths over a supporting surface or inside pipes that have been previously installed and then rigidized in situ.

Another object is to provide a novel permanent conforming pipe that can be adapted during installation to a desired cylindrical or other configuration, such as to fit the interior of a previously installed conduit or passage.

A further object is to provide novel pipe sections that can be joined without additional costly fittings that weaken the overall pipeline structure.

These and further objects will be explained hereinafter and are more particularly delineated in the appended claims.

In summary, however, from one of its important aspects, the invention embraces a permanent conforming pipe having, in combination, first and second flexible parallel membranes, at least one membrane being permeable to a catalyst; a flexible reinforcing layer secured between the first and second parallel membranes, capable of being cured to permanent structurally supporting rigidity by the introduction of a catalyst; and means for introducing a catalyst through a permeable parallel membrane to cure the reinforcing layer. Preferred details and inventive features are hereinafter presented.

The invention will now be described with reference to the accompanying drawings, FIG. 1 of which is a sectional view of a pipe structure constructed in accordance with a preferred form of the invention in an expanded circular cross-sectional cylindrical form;

Figure 1:
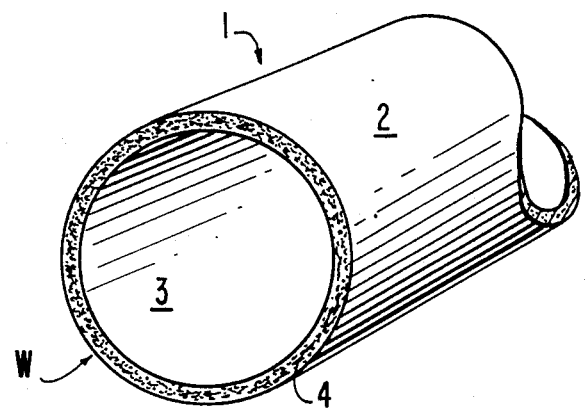
Figure 2:
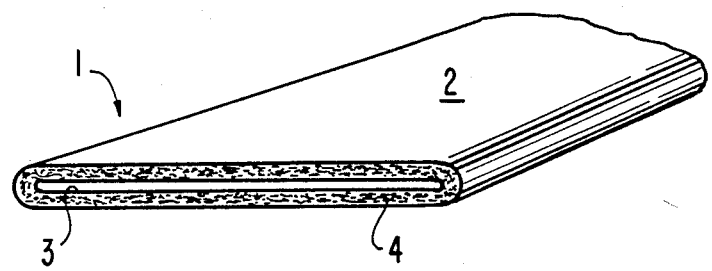
FIG. 2 is a similar view showing the pipe in its flat unexpanded form.

Referring now to FIGS. 1 and 2, the pipe 1 of the present invention, is generally constructed of outer and inner spaced parallel skins or surfaces 2 and 3 having an intermediate reinforcing layer 4 secured or sandwiched therebetween to form a tubular wall W. The skins with the interior layer are transversely closed in oval or cylindrical cross section, such that they are coaxial and have an interior cavity or conduit. The reinforcing layer 4 should initially be flexible but ultimately curable to a structurally rigid form, as with the aid of the introduction of a catalyst into the layer 4. Such a reinforcing layer 4 may, for example, be of dry cement which, when filled between the surfaces 2 and 3 provides the structure 1 with its required flexibility for contouring or storage, but being adapted to be cured by the introduction of water as a catalyst into the cement to harden the layer 4 into a rigid structure of desired cross-sectional shape.

Other types of suitable reinforcing layers 4 will also be discussed hereinafter.

Suitable materials for the skin surfaces 2 and 3 for use in fabricating pipe, FIG. 1, as for conducting water or the like, are flexible plastic, rubber or canvas sheet material. The skins 2 and 3 must have sufficient tensile and shear properties to contain the reinforcing layer 4 without deleterious deformations, such as bulging or tearing, during storage or installation. Additionally, since the skins 2 and 3 provide the primary structural support of the pipe 1 prior to curing the reinforcing layer 4, they should have sufficient tensile strength to allow the pipe 1 to be pulled along a supporting surface without damage, as during the installation of the pipe 1 in a pre-constructed hole or for re-lining an existing pipe as will be described in more detail in reference to FIG. 7. The flat, flexible pipe of FIG. 2 allows easy storage, as on a spindle or roll, providing more pipe length to be stored in a limited area, and removes the imminent danger of breaking, chipping or other damage suffered in storage or transport by rigid ceramic or metal pipes, and the like, and also provides for easy installation over surfaces or as a liner for an existing pipe.

Either or both of the skin surfaces 2 and 3 may also be permeable to the fluid catalyst used to cure the interior reinforcing layer 4 to a rigid state, FIG. 1. Such a sitduation would exist, for example, with an outer skin surface 2 of rubber and an inner skin surface 3 of canvas, sandwiching a dry cement layer 4 therebetween. Introduction of water into the interior channel of the would-be pipe of FIG. 2 will expand or inflate the pipe and also will permeate the canvas inner surface 3 and cure the cement reinforcing layer 4 to structural rigidity. Thereafter further water or other fluids passing through the pipe 1, FIG. 1, will not react with the cement or permeate the canvas and will be effectively conducted by the pipe.

Figure 3:
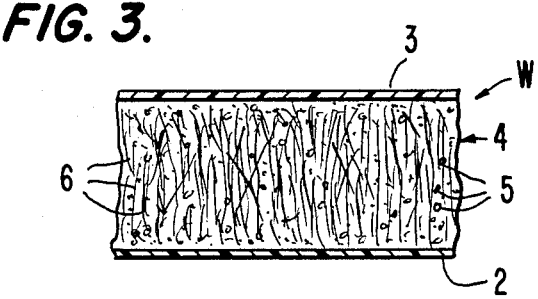
FIG. 3 is an expanded sectional view of the wall of the permanent conforming structure showing an inner and outer layer surrounding a reinforcing layer, in a preferred mode.
Figure 4:
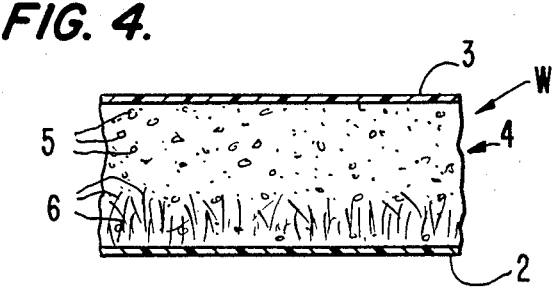
FIG. 4 is an expanded sectional view, similar to FIG. 3, showing a second type of reinforcing layer.

Referring now to FIGS. 3 and 4, wherein like numerals designate like elements, the reinforcing layer 4 is constructed of cement 5 supported by fibers 6. The fibers 6 may be organic or inorganic and may be attached to either or both of the parallel skins 2 or 3 of the wall W to facilitate stabilizing or retaining the cement 5 in place while the structure is still flexible. Numerous methods of stabilizing the cement are contemplated, including a fibrous supporting structure; fibers 6 attached to one skin and extending a portion of the way through the cement 5, as shown in FIG. 4; interior surfaces between and connecting the inner and outer skin surfaces 3 and 2 and compartmentalizing the volume of the interior layer(s) 4; and fibers 6 not attached to either skin surface 2 or 3 but extending essentially throughout the cement 5, as shown in FIG. 3, such as a fibrous-web mat imbedded in the cement.

A pipe 1 of the present invention may also be made to conduct water by using a rubber-backed carpet as the outer skin 2 with the fibers 6 of the carpet pointing upwardly. Powdered cement 5 would then be poured over the carpet fibers 6 and worked into the fibers 6 completely to surround the fibers 6. A top layer of water permeable material, such as canvas or sheet plastic having a plurality of small holes throughout, could be placed over the carpet fibers 6 and cement 5 to act as the inner skin surface wall 3. The construction would then be rolled, as over a mandril, to provide a circular cross-sectional shape, as shown in FIG. 1, and the matching ends of the inner and outer surfaces 3 and 2 would be secured, as by any non-water permeable adhesive means. As will be obvious to one skilled in the art, construction of a pipe 1 would also be easily accomplished with sheet materials spiraled about a mandrel, allowing for any desired pipe lengths.

Storage of the water conducting pipe 1 of FIG. 2, for example, may be effected by winding the flattened pipe on a long spindle, allowing for minimal storage area. Installation would be accomplished over a surface by moving the spindle over the supporting surface and unwinding the pipe from the spindle, such that the flexible pipe conforms to the desired undulations or contours in the surface and can be flexibly directed along any desired path, as before mentioned. The pipe 1 would then be expanded to a preselected diameter, as by the introduction of water to and along the interior of the pipe 1.

Sufficient water pressure must be maintained to expand the pipe 1 from a flat state, as shown in FIG. 2, to a desired open cylindrical fluid conducting state, such as a circular cross-sectional form shown in FIG. 1, until the reinforcing layer 4 has become rigid and structurally self supporting. After the cement 5 has fully cured, the water may be released and the pipe 1 will retain the permanent cylindrical shape of FIG. 1, distributed along the desired path layed-out during installation. As the cement 5, after curing, is also water-impermeable, the pipe 1 will be suitable for conducting water and other like fluids or for protectively surrounding cables and the like along the desired path.

Optionally, as when water is scarce, steam or other catalyst bearing gas or vapor may be introduced under pressure into the pipe 1 to expand the pipe 1 and cure the reinforcing layer 4. Also, a conductive-fluid impermeable inner surface 3 may necessitate a catalyst being introduced through the outer wall 2 skin surface such that the interior expanding fluid would not simultaneously cure the reinforcing layer 4 into rigidity but hold it in position for curing as a result of the external introduction of the rigidizing material or catalyst.

Figure 5:
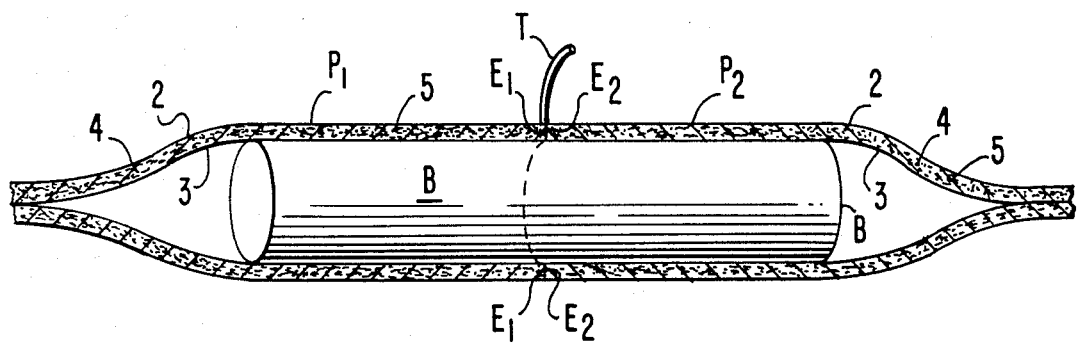
FIG. 5 is a side elevation partially cut-away view of two pipes partially expanded and joined in accordance with a preferred form of the present invention.

Although single lengths of pipe 1, being formable and storable in great lengths, may be sufficient to form any desired pipeline, joining of such pipes 1 may become necessary. Referring to FIG. 5, two such lengths of pipe $P_1$ and $P_2$ can be joined while in their flexible state and during the installation procedure. To join the pipes $P_1$ and $P_2$, they should be layed out with end edges $E_1$ and $E_2$ touching. This will require that the skins and sandwiched interior reinforcing layer of pipe $P_1$ contact the skins and reinforcing layer 4 of pipe $P_2$, respectively. A flexible cylindrical balloon B may be inserted into the touching ends of pipes $P_1$ and $P_2$ such that half of the balloon B is in each of the pipes $P_1$ and $P_2$. The balloon B is then inflated, as through a tube T, to support the ends of the pipes $P_1$ and $P_2$ in an open cylindrical shape and the contacting reinforcing layers 4 are cured while the pipe $P_1$ and $P_2$ ends are so supported. With a water-permeable outer skin 2 and a cement 5 reinforcing layer 4, as previously described, introduction of water through the outer skin 2 would cure the cement 5 in each pipe $P_1$ and $P_2$ into a single rigid cylindrical structure. The outer wall may also be connected, as by a mastic or tape, and the balloon B deflated and flushed through the pipeline during use, or recovered in some other way. Finally, the hole remaining in the pipeline where the tube T extended between the edges $E_1$ and $E_2$ of the pipes $P_1$ and $P_2$ could be plugged, as with cement, providing a rapidly joined pipeline of two pipes $P_1$ and $P_2$ without weakened structural integrity. The remainder of the pipeline would be expanded or inflated and cured as previously described.

Figure 6:
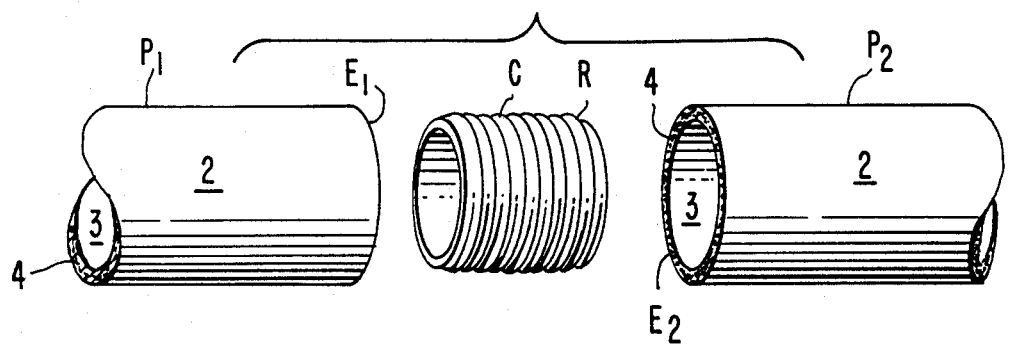
FIG. 6 is an expanded side view of two pipes joined in an optional manner.

FIG. 6 shows an optional method of joining two such pipes $P_1$ and $P_2$. As described above for FIG. 5, the pipes $P_1$ and $P_2$ should be layed out with their edges $E_1$ and $E_2$ touching. A rigid connector C, such as a plastic cylinder having outer surface ridges R for frictionally engaging the inner skins 3 of the pipes $P_1$ and $P_2$ is inserted into the pipes $P_1$ and $P_2$. The connector C supports the ends of the pipes $P_1$ and $P_2$ in the desired open cylindrical shape and the pipes $P_1$ and $P_2$ may then be inflated and cured as previously described, the connecting reinforcing layers 4 at the edges $E_1$ and $E_2$ curing to a single rigid structure as described above for FIG. 5. The pipes $P_1$ and $P_2$ may also be clamped, such as by a cylindrical clamp (not shown), to provide greater strength at the joint of the pipes $P_1$ and $P_2$, if desired.

Figure 7:
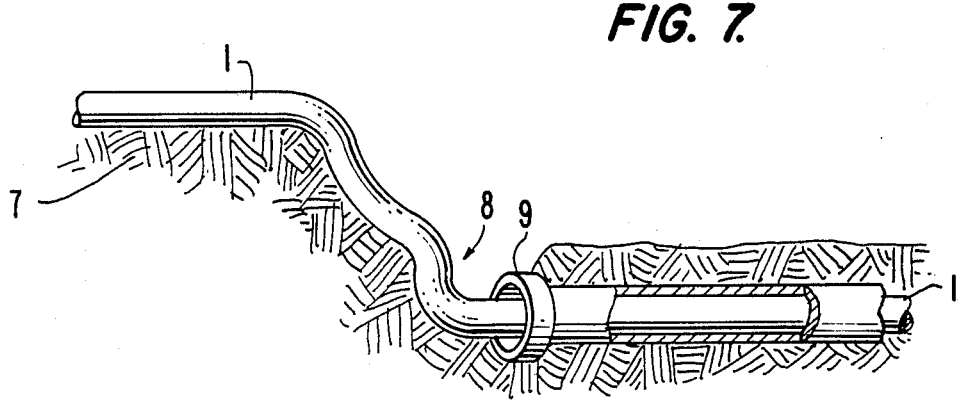
FIG. 7 is a partially cut-away side elevation of a pipe of the present invention installed on a surface and employed for re-lining an existing pipeline.

Referring now to FIG. 7, and as previously mentioned, the pipe 1 can be installed to conform with supporting surface undulations or irregularities and to re-line existing pipelines. While in a flexible state, the pipe 1 is layed out over a supporting surface, such as soil 7 or in a hole or trench 8 cut in the soil 7. Such a trench 8 may be used to expose a section of previously installed pipe 9, or other housing, to allow re-lining of the existing pipe 9 with the pipe 1. As shown, the pipe 1 flexibly conforms to the surface irregularities, such as hills, bumps or trenches and can be inserted, as by pulling or pushing through an existing pipe 9 to re-line the pipe. Lubricants, such as soap, could be used on the outer surface of the pipe 1 to facilitate ease of insertion into the pipe 9.

After the pipe 1 is layed, it is then expanded to a desired shape, and cured with the outer skin surface of the pipe 1 preferably conforming to the shape of the inner wall or surface of the existing pipe 9. After curing the pipe 1 into rigidity, as previously described, the pipe 1 is structurally supported and the trench 8 can be filled without damage to the pipe 1.

Such a conforming pipe 1 for insertion into an existing pipe and easy connection to other conforming pipes, as explained previously, allows a long pipeline to be re-lined easily with only minimal excavation of the existing pipeline. Over a long existing pipeline small holes would need to be broken into the existing pipe, sufficient for a conforming pipe to be inserted therewithin. When conforming pipe can no longer be drawn through the existing pipe due to friction, a new hole will be opened into the existing pipe near the extreme end of the conforming pipe and a second conforming pipe inserted further into the existing pipe from the new hole. The two conforming pipes are then joined as previously described, and by such means an extended pipeline can be re-lined by the permanent conforming pipe of the present invention.

Other modifications include corrugating or waffling to reduce the weight of the pipe 1 and to stabilize or support the reinforcing layer 4 in its flexible state. Additionally, other structures, such as rectangular, or cylindrical (tubular) sewage tanks or cisterns, as well as sectional walls of partial cylindrical shape can be easily created under the present invention by proper construction of the walls and reinforcing layer and proper inflation to the desired shape. The term cylindrical, therefore, herein includes curvilinear walls having a radius of curvature and the term pipe includes any hollow shape constructed with curvilinear walls.

While the invention has been described with reference to preferred embodiments, further modifications will occur to those skilled in the art, which are considered to fall within the spirit and scope of the invention as defined in the appended claims.

What is claimed is:

1. A method of forming a rigid pipe of predetermined cross section and shape, that comprises, filling the volume between longitudinally extending inner and outer flexible coaxial coextensive cylindrical skins with a flexible filler of the type that can be catalyzed by a fluid catalytic medium into a rigid state, the inner skin bounding a hollow interior coaxial space; positioning the flexible skins along a predetermined surface contour; and expanding said space and coaxial skins to form a pipe of predetermined cross section, while catalyzing said filler to rigidize the pipe, at least one of the skins being permeable to the catalytic medium, which is introduced therethrough into the filler, and in which said one of the skins is the inner skin and said expanding is effected by introducing the catalytic medium into said space.

2. A method as claimed in claim 1 and in which the volume between said skins is filled with dry cement and the catalytic medium is water.

* * * * *